(12) United States Patent
Astigarraga et al.

(10) Patent No.: US 10,033,572 B2
(45) Date of Patent: Jul. 24, 2018

(54) RESILIENCY IN ETHERNET FABRIC ARCHITECTURES BY EVENT NOTIFICATION

(71) Applicant: INTERNATIONAL BUSINESS MACHINES CORPORATION, Armonk, NY (US)

(72) Inventors: Tara Astigarraga, Fairport, NY (US); Christopher V. Derobertis, Hopewell Junction, NY (US); Louie A. Dickens, Tuscon, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 74 days.

(21) Appl. No.: 14/644,336

(22) Filed: Mar. 11, 2015

(65) Prior Publication Data
US 2016/0269220 A1     Sep. 15, 2016

(51) Int. Cl.
| H04L 12/24 | (2006.01) |
| H04L 12/911 | (2013.01) |
| H04L 12/851 | (2013.01) |
| H04L 29/08 | (2006.01) |

(52) U.S. Cl.
CPC ........ *H04L 41/06* (2013.01); *H04L 29/08009* (2013.01); *H04L 47/24* (2013.01); *H04L 47/745* (2013.01); *H04L 69/321* (2013.01); *H04L 67/26* (2013.01)

(58) Field of Classification Search
None
See application file for complete search history.

(56) References Cited

U.S. PATENT DOCUMENTS

| 8,625,597 | B2 | 1/2014 | Berman | |
| 2004/0081083 | A1* | 4/2004 | Sekihata | H04L 12/42 370/222 |
| 2006/0092952 | A1* | 5/2006 | Boutros | H04L 41/06 370/400 |
| 2008/0117904 | A1* | 5/2008 | Radha | H04L 1/0009 370/389 |

(Continued)

FOREIGN PATENT DOCUMENTS

WO     2013032913 A1     3/2013

OTHER PUBLICATIONS

Mueller, Julius; "Flexible Cross Layer Optimization for Fixed and Mobile Broadband Telecommunication Networks and Beyond"; Sep. 2014; pp. 3-4, and 151.*

(Continued)

*Primary Examiner* — Christopher Crutchfield
*Assistant Examiner* — Tito Pham
(74) *Attorney, Agent, or Firm* — Griffiths & Seaton PLLC

(57) ABSTRACT

Methods, computer systems, and computer program products for improving resiliency in computing components functioning according to a multilayered Open Systems Interconnection (OSI) model in a network architecture running Ethernet or Internet protocols by a processor device are provided. Upon detection of at least one of a certain event within a specified layer of a network architecture, a notification of the event is provided in an inter-layer basis, such that the responsible entity manages the event according to an OSI model-wide system.

21 Claims, 3 Drawing Sheets

(56) References Cited

U.S. PATENT DOCUMENTS

| | | | | |
|---|---|---|---|---|
| 2012/0008506 A1* | 1/2012 | Astigarraga | ........ | H04L 41/0677 |
| | | | | 370/242 |
| 2013/0163407 A1* | 6/2013 | Sinha | .................... | H04W 40/12 |
| | | | | 370/217 |
| 2013/0201876 A1* | 8/2013 | Martin | .................. | H04W 84/18 |
| | | | | 370/255 |
| 2013/0311675 A1 | 11/2013 | Kancherla | | |
| 2014/0344799 A1* | 11/2014 | Thodati | ..................... | G06F 8/65 |
| | | | | 717/171 |

OTHER PUBLICATIONS

Anonymous, "Adaptive Flows for SDN—Open Flow", Apr. 24, 2014, 8 pages, IP.com, IPCOM000236397D.

* cited by examiner

RESILIENCY IN ETHERNET FABRIC ARCHITECTURES BY EVENT NOTIFICATION

BACKGROUND OF THE INVENTION

Field of the Invention

The present invention relates in general to computers, and more particularly to networks running Ethernet and/or Internet protocols. Still more particularly, the present invention relates to methods, computer systems, and computer program products for improving resiliency in networks running Ethernet or Internet protocols.

Description of the Related Art

The Ethernet and Internet architectures play a growing fundamental role in the delivery of data. Data is now being sent to and received from a larger variety of dissimilar systems, such as cloud storage systems, network attach storage systems and/or storage area network devices running protocols (i.e. FCoE). Many of these dissimilar systems require expeditious data delivery within a high degree of reliability. Historically, this reliability has been ensured in Ethernet and Internet architectures by setting up and tracking quality of service (QoS) standards.

SUMMARY OF THE DESCRIBED EMBODIMENTS

Various embodiments for improving resiliency in computing components functioning according to a multilayered Open Systems Interconnection (OSI) model in a network architecture running Ethernet or Internet protocols, by a processor device, are provided. Upon detection of at least one of a certain event within a specified layer of a network architecture, a notification of the event is provided on an inter-layer basis, such that the responsible entity manages the event according to an OSI model-wide system.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Embodiments of the present invention provide methods, computer systems, and program product codes for improving resiliency in networks by event notification, wherein upon detection of at least one of a certain event within a specified layer of a network architecture, a notification of the event is provided in an inter-layer basis, such that the responsible entity manages the event according to an OSI model-wide system. Events for detection are included to be any event that affects device availability, reliability, or performance. Upon detection of such events, a notification of the event is sent to a network, such as a Software Defined Network, or end user. The network then may use such information provided by the notification to reconfigure the portion of the network associated with the event.

In the interest of clarity, not all features of an actual implementation are described in this Specification. It will of course be appreciated by one of ordinary skill in the art, that in the development of any such actual embodiment, numerous implementation-specific decisions must be made to achieve the developers specific goals, such as compliance with system-related and business-related constraints, which will vary from one implementation to another. Furthermore, it will be appreciated that such a development effort may be complex and labor-intensive, but would nevertheless be a routine undertaking for those of ordinary skill in the art having the benefit of this Disclosure.

As aforementioned, Ethernet and Internet architectures play a growing fundamental role in the delivery of data. Data is now being sent to and received from a larger variety of dissimilar systems, such as cloud storage systems, network attach storage systems and/or storage area network devices running protocols (i.e. FCoE). Many of these dissimilar systems require expeditious data delivery within a high degree of reliability. Historically, this has been ensured in Ethernet/Internet architectures by setting up and tracking quality of service (QoS) standards. QoS standards, however, do not account for any underlying infrastructure issues, which may affect the QoS, nor does it consist of functionality to send notifications of events that may affect reliability, performance, or availability. Accordingly, the present invention teaches a method of augmenting existing QoS practice such that infrastructure issues are addressed via communicated event notifications.

Figure 1:
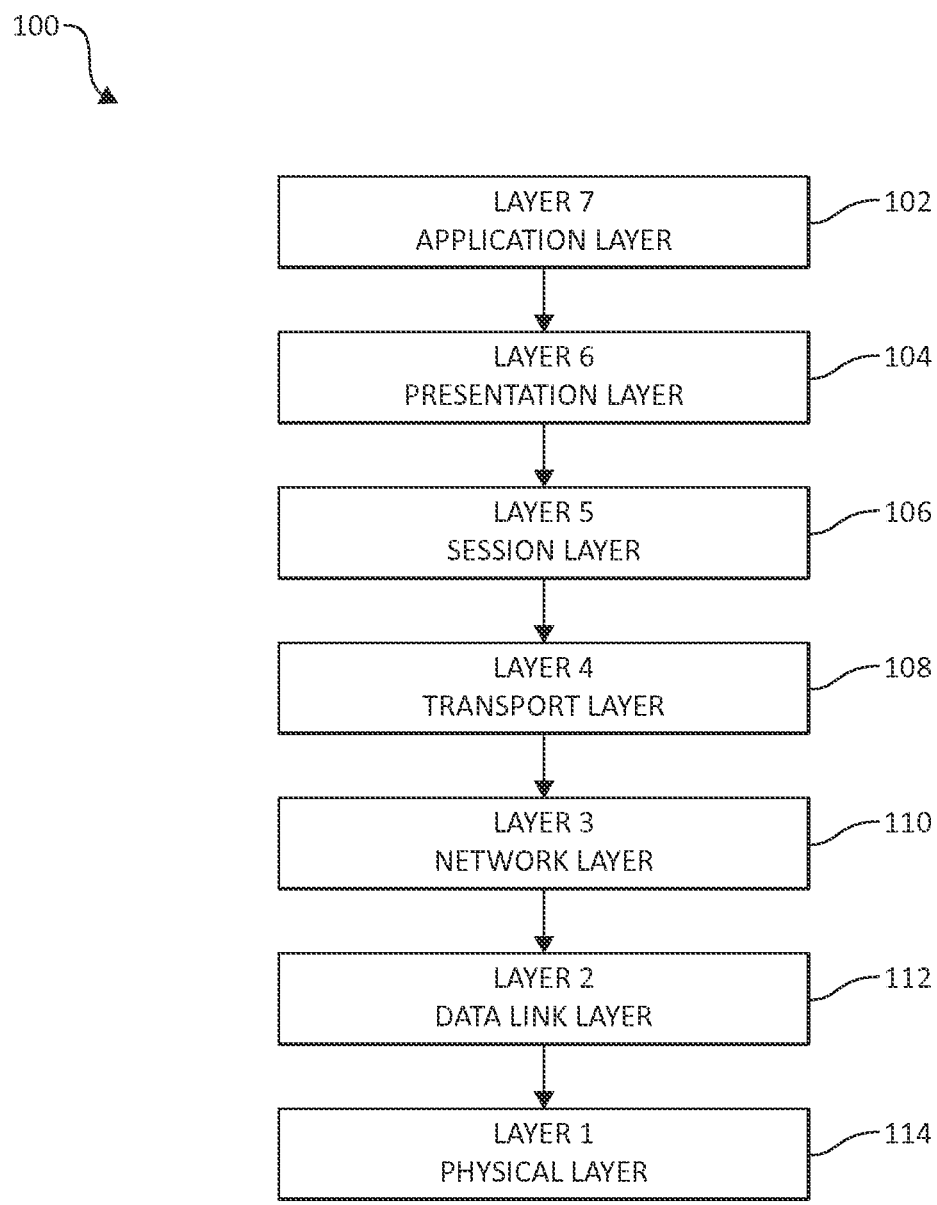
FIG. 1 illustrates the functional layers of the Open System Interconnection (OSI) model.

The Open Systems Interconnection (OSI) model is one simple way of describing the data path over a communication system between one or more computing devices, or even more simply, a network. As illustrated in FIG. 1, the OSI model 100 consists of seven separate, isolated layers. Layer 1, or the Physical Layer 114; Layer 2, or the Data Link Layer 112; Layer 3, or the Network Layer 110; Layer 4, or the Transport Layer 108; Layer 5, or the Session Layer 106; Layer 6, or the Presentation Layer 104; and Layer 7, or the Application Layer 102.

With few exceptions, these layers do not communicate with each other, yet all depend implicitly on one another to move data from one location to another. Businesses, such as International Business Machines, Inc. (IBM), and their clients, as well as the public as a whole, rely on these separate layers each day in what is generally an unseen, and often unappreciated, quartet of orchestrated data movement. Software and hardware from any number of vendors must work together seamlessly for these seven layers to function.

Large data center environments, such as storage area networks (SANs), deal largely with layer 2 and layer 3 of the OSI model, or the data link layer. Layer 2 devices, such as network switches, must communicate with one another harmoniously and reliably even as the size and complexity of these environments continues to exponentially grow. It is increasingly paramount for the interconnections of these systems to operate fluidly and without downtime.

Traditionally, layer 2 and layer 3 devices provide limited notification and take no corrective action when transient error conditions occur on their links, even as such error conditions may be affecting performance or reliability. Although most devices add an entry to an internal log regarding such conditions, the information is stale unless promulgated throughout the network. It is increasingly paramount that the appropriate entity be made aware of less than optimal conditions within the network such that corrective actions may be taken if necessitated.

In large part, this reactive practice is due to the fact that although these devices pass data to one another, they do not communicate to one another the health of the network. In other words, if one device detects an error, or experiences a breakdown of communications, generally the other devices on the network are not made aware of the situation. Problems then that might have been simply solved proactively continue to fester until a significant issue arises.

The present invention is available to existing computing systems without the need for separate hardware, and consists of monitoring and detecting for events which may impact the QoS. When such an event is detected, the mechanisms of the present invention provide for a notification of the event and its attributes to be delivered to a controlling entity, other devices on the network, or both. Moreover, the present invention discloses methods and embodiments to employ event notification within the operating layers of networks running Ethernet and/or Internet protocols.

The present invention may be implemented in a variety of advanced Ethernet architectures, however two such environments will be studied. One example of an environment in which event notification functionality may be advantageous is a cloud being managed by a Software Defined Network architecture, such as OpenFlow™. In another embodiment, such functionality may be employed in a Fibre Channel over Ethernet (FCoE) device being managed by a Software Defined Network architecture, such as OpenFlow™. Other network architectures may be implemented as will be apparent to one of ordinary skill in the art.

Figure 2:
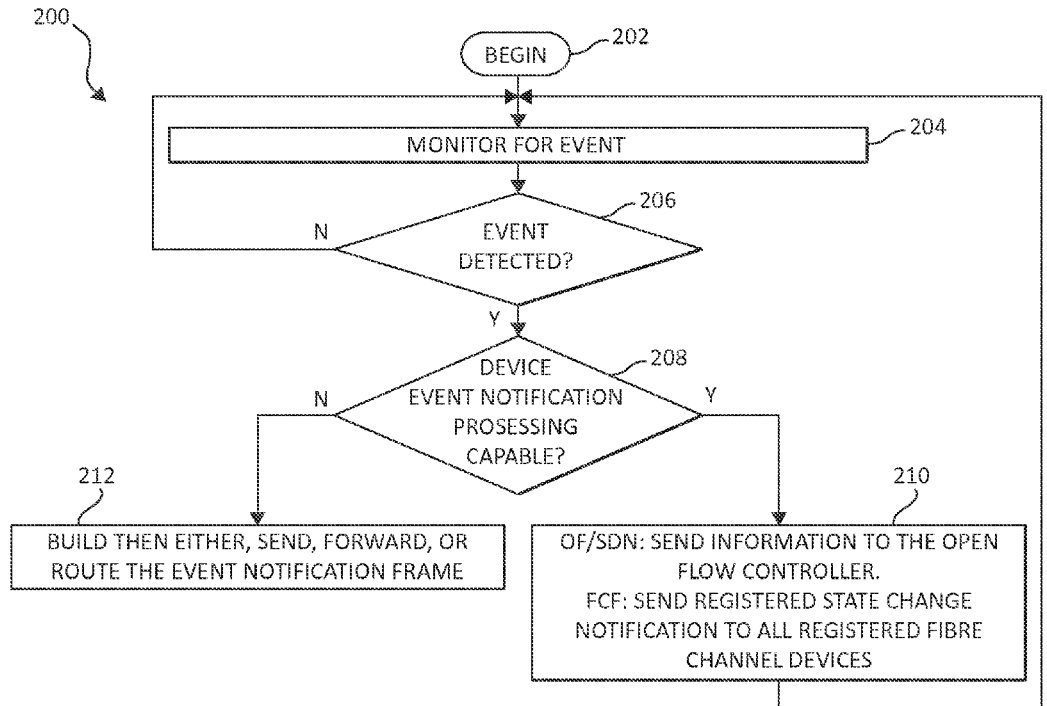
FIG. 2 illustrates a flow chart according to one aspect of the present invention.

Turning now to FIG. 2, which illustrates one example of one embodiment of the present invention, in which a layer 2 device operating within a Software Defined Network architecture detects an event internally on one of its own ports 200. The process begins at step 202 and includes monitoring and tracking, by the device, event information and failure rates 204 that would impact the quality of service (QoS). Once an event has been detected 206, the action taken is representative of the functionality of the device.

Devices operating within the Software Defined Network architecture may or may not be capable of processing event notifications. Devices that have event notification capabilities 208, will send the event information and attributes to a controlling entity 210, such as the OpenFlow™ Controller over the OpenFlow™ channel.

Similarly, devices operating within a Software Defined Network architecture running FCoE protocol may or may not possess event notification capabilities. Devices having such capabilities in this environment send the event information and attributes to a Fibre Channel Forwarder (FCF) 210. The FCF then sends a registered state change notification to all devices that have registered to receive state change notifications.

If the device is not capable of sending an event notification frame to a network manager, such as the OpenFlow™ Controller, the device builds an event notification frame that contains the details of the event. This frame contains the Multicast Well Known address for event notification. The frame is then sent, forwarded, or routed, depending on the type of the device that detected the event 212. Any device capable of event notification that receives the multicast frame then sends the frame containing detailed event information to the network manager.

Figure 3:
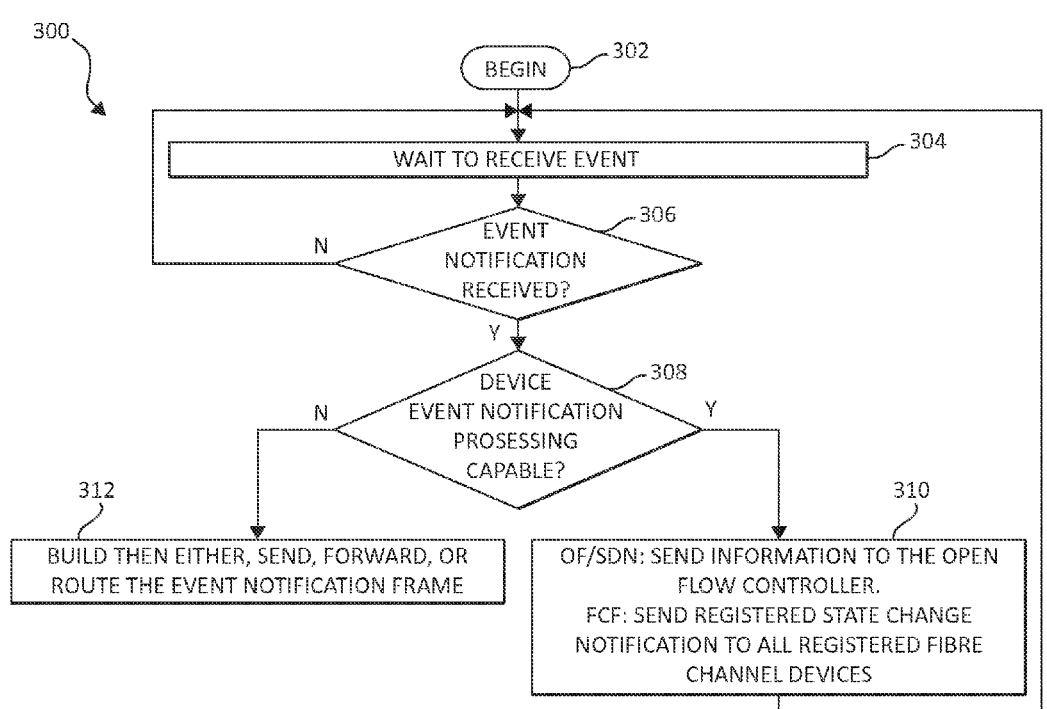
FIG. 3 illustrates an additional flow chart according to one aspect of the present invention.

FIG. 3 illustrates an embodiment of the present invention in which the layer 2 device did not itself experience the event, but rather received notification of the event from another source 300. The process begins at step 302 and includes waiting, by the device, to receive any event information and failure rates 304 that would impact the quality of service (QoS). Once notification of an event has been received 306, the action taken is again representative of the functionality of the device.

Devices operating within a Software Defined Network architecture and possessing event notification capabilities 308, send the event information and attributes to a controlling entity 310, such as the OpenFlow™ Controller over the OpenFlow™ channel.

Devices operating within a network architecture running FCoE protocol, send the event information and attributes to the Fibre Channel Forwarder (FCF) 310. The FCF then sends a registered state change notification to all devices that have registered to receive state change notifications.

If the device is not capable of sending an event notification frame to a network manager, such as the OpenFlow™ Controller, the device builds an event notification frame that contains the details of the event. This frame contains the Multicast Well Known address for event notification. The frame is then sent, forwarded, or routed, depending on the type of the device that detected the event 312. Any device capable of event notification that receives the multicast frame then sends the frame containing detailed event information to the network manager. End port devices, for example, send the frame, switches flood the frame out of all its ports, and routers broadcast or multicast the frame on all subnets.

In either case, the purpose is to get the event information to all other sources on or within the network. Consider this common example that illustrates the need for event notification. Device A is a FCoE initiator actively running data traffic to a fibre channel (FC) Target B. Target B is disconnected from the FC switch and Target C is inserted into its port. Target C may receive the same N_Port_ID that Target B had previously. Without event notification functionality, Device A would then be unaware that it is running data traffic to an entirely different target.

Figure 4:
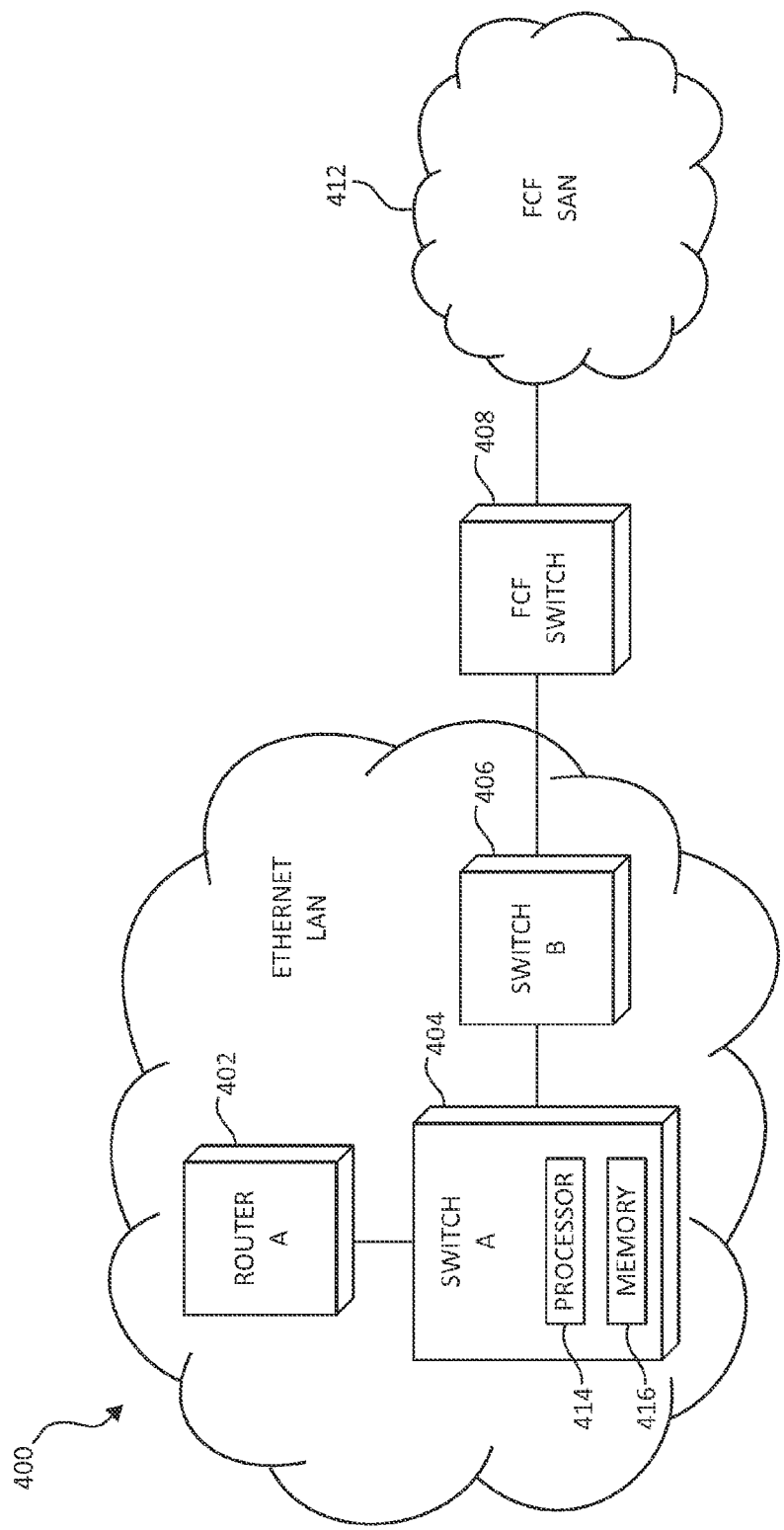
FIG. 4 illustrates a simplified block diagram of an Ethernet architecture in which functionality of the present invention may be realized.

FIG. 4 illustrates a simplistic Ethernet LAN architecture 400 connected to a storage area network (SAN) architecture 412 in which the present invention may be appreciable. Ethernet LAN 400 consists of router A 402, switch A 404, and switch B 406. Switch A 404 has coupled processor 414 and memory 416. A Fibre Channel Forwarder (FCF) switch 408 connects Ethernet LAN 400 to SAN 412.

Each layer 2 device within architecture 400 monitors for quality of service (QoS) events. Additionally, each device is on standby to receive notification of such an event from another device within the environment. When an event is detected, a device with event notification capabilities sends notification to the FCF. The FCF then sends a registered state change notification to all devices that have registered to receive state change notifications. If the detecting device is not event notification capable, the device builds a frame containing the event information and deliver the notification across the environment according to the type of device.

The events described in the aforementioned process may be simply abnormalities or quality of service (QoS) failure events, the scope of which will be dependent upon the specific implementation of the present invention. A QoS event is regarded as any event that is or will affect the reliability or performance of the environment.

The broadcasting of event notification in the aforementioned process may use any and all accepted standards of event notification. Such examples may include broadcasting, or IPv4, multi-casting, or IPv6, MAC address broadcasting, or any other method of sending or relaying event description information, the aforementioned as limited examples only.

Although the present invention has been described above on the basis of the embodiment, the technical scope of the present invention is not limited to the above embodiment. It is apparent to those skilled in the art that various modifications or improvements can be added to the above embodiment.

It should be noted that execution orders of processes, such as operations, procedures, steps and stages in the devices, systems, programs and methods shown in the scope of claims, the description and the drawings, are not clearly specified particularly by use of expressions such as "before" and "prior to." Therefore, those processes are executable in any orders unless an output from a preceding process is used in a process subsequent thereto. Even if any operational flow in the scope of claims, in the description or in the drawings has been described by use of expressions such as "firstly," and "subsequently," for the sake of convenience, this does not necessarily mean that the operational flow has to be executed by an order indicated by these expressions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for improving resiliency in computing components functioning according to a multilayered Open Systems Interconnection (OSI) model in a network architecture running Ethernet or Internet protocols, by a processor device, comprising:
    upon detection of at least one transient quality of service (QoS) event associated with a network health within a specified layer of the network architecture, providing a notification of the event in an inter-layer basis, such that a responsible entity comprising an entity which detected the event manages the event by forwarding the notification describing the event to each device in the network architecture on the inter-layer basis according to an OSI model-wide system; wherein forwarding the notification on the inter-layer basis further includes end port devices sending the notification, switch devices flooding the notification from all ports, and router devices broadcasting or multicasting the notification from all subnets thereby providing the notification on the inter-layer basis so as to notify at least all layer 2 and layer 3 devices in the network architecture of the detected at least one transient QoS event.

2. The method of claim 1, further including detecting the at least one QoS event.

3. The method of claim 2, further including notifying, by devices that support event notification, a controlling entity of the at least one QoS event and its attributes.

4. The method of claim 2, further including notifying, by devices that support event notification, all registered devices in the network of the at least one QoS event and its attributes.

5. The method of claim 4, wherein notifying further includes creating or forwarding a set of packets and frames containing a description and attribute information of the at least one QoS event.

6. The method of claim 2, wherein the QoS event is defined as any event that affects the reliability or performance of the network.

7. The method of claim 1, wherein the notification is performed by a firmware update to computing components.

8. A system for improving resiliency in computing components functioning according to a multilayered Open Systems Interconnection (OSI) model in a network architecture running Ethernet or Internet protocols, comprising:
    at least one processor device, operable within the Ethernet fabric environment, wherein the at least one processor device:
        upon detection of at least one transient quality of service (QoS) event associated with a network health within a specified layer of the network architecture, provides a notification of the event in an inter-layer basis, such that a responsible entity comprising an entity which detected the event manages the event by forwarding the notification describing the event to each device in the network architecture on the inter-layer basis according to an OSI model-wide system; wherein forwarding the notification on the inter-layer basis further includes end port devices sending the notification, switch devices flooding the notification from all ports, and router devices broadcasting or multicasting the notification from all subnets thereby providing the notification on the inter-layer basis so as to notify at least all layer 2 and layer 3 devices in the network architecture of the detected at least one transient QoS event.

9. The system of claim 8, wherein the at least one processor device detects the at least one QoS event.

10. The system of claim 9, wherein the at least one processor device notifies, by devices that support event notification, a controlling entity of the at least one QoS event and its attributes.

11. The system of claim 9, wherein the at least one processor device notifies, by devices that support event notification, all registered devices in the network of the at least one QoS event and its attributes.

12. The system of claim 11, wherein the at least one processor device notifies, the notifying further including creating or forwarding a set of packets and frames containing a description and attribute information of the at least one QoS event.

13. The system of claim 9, wherein the QoS event is defined as any event that affects the reliability or performance of the network.

14. The system of claim 8, wherein the notification is performed by a firmware update to computing components.

15. A computer program product for improving resiliency in computing components functioning according to a multilayered Open Systems Interconnection (OSI) model in a network architecture running Ethernet or Internet protocols by at least one processor device operable within the OSI model, the computer program product comprising a non-transitory computer-readable storage medium having computer-readable program code portions stored therein, the computer-readable program code portions comprising:

a first executable portion that, upon detection of at least one transient quality of service (QoS) event associated with a network health within a specified layer of the network architecture, provides a notification of the event in an inter-layer basis, such that a responsible entity comprising an entity which detected the event manages the event by forwarding the notification describing the event to each device in the network architecture on the inter-layer basis according to an OSI model-wide system; wherein forwarding the notification on the inter-layer basis further includes end port devices sending the notification, switch devices flooding the notification from all ports, and router devices broadcasting or multicasting the notification from all subnets thereby providing the notification on the inter-layer basis so as to notify at least all layer 2 and layer 3 devices in the network architecture of the detected at least one transient QoS event.

16. The computer program product of claim 15, further comprising a second executable portion that detects the at least one QoS event.

17. The computer program product of claim 16, further comprising a third executable portion that notifies, by devices that support event notification, a controlling entity of the at least one QoS event and its attributes.

18. The computer program product of claim 16, further comprising a third executable portion that notifies, by devices that support event notification, all registered devices in the network of the at least one QoS event and its attributes.

19. The computer program product of claim 18, further comprising a fourth executable portion that notifies, the notifying further including creating or forwarding a set of packets and frames containing a description and attribute information of the at least one QoS event.

20. The computer program product of claim 16, wherein the QoS event is defined as any event that affects the reliability or performance of the network.

21. The computer program product of claim 15, wherein the notification is performed by a firmware update to computing components.

* * * * *